(12) United States Patent
Ogden

(10) Patent No.: US 6,311,164 B1
(45) Date of Patent: Oct. 30, 2001

(54) REMOTE JOB APPLICATION METHOD AND APPARATUS

(75) Inventor: Edward W. Ogden, Denver, CO (US)

(73) Assignee: Job Files Corporation, Aurora, CO (US)

( * ) Notice: Subject to any disclaimer, the term of this patent is extended or adjusted under 35 U.S.C. 154(b) by 0 days.

(21) Appl. No.: 09/000,736

(22) Filed: Dec. 30, 1997

(51) Int. Cl.[7] .................................................. G06F 17/60
(52) U.S. Cl. .................................... 705/7; 705/1; 705/11; 379/88; 379/96; 379/212; 379/218; 379/219; 379/229; 235/56; 235/386; 434/336
(58) Field of Search ................................ 705/1, 8, 9, 500; 379/219, 88, 96, 212, 218, 229, 245, 243; 235/56, 386; 434/336

(56) References Cited

U.S. PATENT DOCUMENTS

| | | | |
|---|---|---|---|
| 5,758,324 | * | 5/1998 | Hartman et al. ........................ 705/1 |
| 5,797,133 | * | 8/1999 | Jones et al. ............................ 705/38 |
| 5,870,464 | * | 2/1999 | Brewster et al. .................... 379/219 |
| 5,870,721 | * | 11/1994 | Norris .................................... 705/38 |

FOREIGN PATENT DOCUMENTS

| | | | | |
|---|---|---|---|---|
| WO 9506294 A | * | 3/1995 | (WO) | .............. G06F/17/50 |
| WO 1988-3222207 | * | 5/1998 | (WO) | .............. G06F/17/60 |
| W)1998-467143 | * | 8/1998 | (WO) | .............. G06F/157/00 |

OTHER PUBLICATIONS

USPTO, http://www.uspto.gov/go/jars/index.html, pp. 1–14, Feb. 1997.*
USAPPLY, http://www.usapply.com/office.html, p. 1, 1996.*
USAPPLY, http:/www.usapply.com/application.html, p. 1, 1996*
USAPPLY, http:/www.usapply.com/usapply/index.html, pp. 1–14, 1996.*
USAPPLY, http://www.usapply.com/carrigans1.html, pp. 1–2, 1996.*
USAPPLY, http://www.usapply.com/street/talk.html, pp. 1–3, 1996.*

* cited by examiner

Primary Examiner—Vincent Millin
Assistant Examiner—Cuong H. Nguyen
(74) Attorney, Agent, or Firm—Sheridan Ross

(57) ABSTRACT

A central location receives calls from remotely located job applicants and handles said calls including transmitting messages to applicants and receiving information from applicants over an electronic telecommunication link, automatically and directly. The system provides for real time applicant involvement while permitting applicants to initiate a job application procedure at a time and location selected by the applicant. Preferably calls are handled by a software engine which can identically process any of a plurality of script files containing both provisions for messages sent to and received from applicants and logic flow or branch records, all of which are preferably end-user configurable.

12 Claims, 3 Drawing Sheets

REMOTE JOB APPLICATION METHOD AND APPARATUS

The present invention relates to a job application method and apparatus and in particular to a system which facilitates receiving and processing job application information from remote applicants using a telecommunications system.

BACKGROUND INFORMATION

A number of institutions expend considerable time and other resources in an effort to find, evaluate and hire employees. These efforts commonly include written employment application forms, personal interviews or a combination thereof. Each of these techniques involves committing company time and other resources and are associated with certain disadvantages.

The preparation of a written job application form requires an amount of company time particularly when it is desired to customize the solicitation of information to various different jobs. Filing out such a form also requires a time investment by an applicant, often greater than the time investment needed for e.g., orally answering questions, and thus could result in discouraging a number of desirable and qualified applicants. In addition to the time required to prepare the form, processing the written form requires time such as time for processing requests for application forms from potential applicants, selecting the proper form for a given job, mailing or otherwise distributing the form to applicants, receiving completed forms and, typically, transferring the data from the written form to another format such as data entry into a computer and/or reviewing the information presented in the written application form. Thus, the written application form procedure is not a "real time" procedure in the sense that the company does not receive the information from the applicant simultaneously with it being provided by the applicant (i.e. there is a delay involved in the applicant filling out the form and the company processing the data in the form). Processes which are not real time, in addition to typically requiring company time for such procedures as data entry, also inherently fail to provide an indication of how the applicant reacts under a time stress situation and provide relatively unreliable data regarding the applicant's responsiveness (e.g. for employment situations in which promptness of response is a factor in evaluating an applicant or awarding a job).

Personal interviews of job applicants can provide some degree of real time involvement, but have a number of disadvantages. Personal interviews require a substantial investment of time by company personnel conducting the interview. There is a potential, in personal interviews, for the interviewer to solicit information in an undesirable fashion. For example, the company personal conducting personal interviews may ask improper questions (e.g. questions which are not relevant to the particular job involved or which may violate legal or internal company standards, such as questions improperly relating to applicant's race, marital status and the like. Additionally, company personnel conducting personal interviews may exhibit a certain degree of inconsistency (particularly when different company personnel conduct interviews for the same job) e.g. by asking different questions of different applicants. Although many of these disadvantages can be reduced by establishing stringent training and supervision standards for interviewers, there is a cost associated with establishing such training and supervision standards. The cost of training and supervising interviewers is particularly acute when it is desired to provide different interview processes with respect to different jobs. Although personal interviews involve a degree of real time involvement, this is achieved by, typically, requiring the applicant to conform his or her schedule to that of the interviewer, and often by requiring the applicant to physically travel to a central interview location, both of which may discourage otherwise desirable and qualified applicants. Typically after a personal interview, it is necessary to evaluate the interview data which often requires the interviewer to provide written or other summaries of the interview, potentially introducing the possibility of interviewers (intentionally or unintentionally) misrepresenting the information provided by the applicant and requiring additional expenditure of time by company personnel.

Accordingly, it would be advantageous to provide a job application procedure and apparatus which avoids discouraging potentially qualified applicants, particularly those that may be remotely located, reduces time and other company resource expenditures, even when it is desired to tailor the job application procedure to different jobs, provides for consistency and compliance with legal and company policies and provides a substantial degree of real time involvement by the applicant during the application procedure.

SUMMARY OF THE INVENTION

The present invention provides for a job application procedure and apparatus in which a central location, provided with a computer, receives telecommunications initiated by remotely-located applicants, typically in response to advertisements indicating that applicants may call a specified telephone number to apply for one or more jobs. The central computer obtains information regarding the identity of the applicant (e.g. name, telephone number, address, etc.) which is stored by the computer at the central location. The computer asks questions or otherwise provides prompts to the applicant, such as, in one embodiment, playing audio prompts over a telephone connection. The applicant responds to at least some such prompts such as by providing dual tone multi-frequency (DTMF or "touch tone") responses via a telephone keypad or other user input device and/or by providing a audio or voice response e.g. using a telephone handset microphone or other microphone. Some, or preferably all, responses of the job applicant are stored in the computer in a manner associated with the identity of the applicant.

In one embodiment, calls are handled using a script file which contains both communication-type elements (e.g. elements specifying that a message should be played or data received) and logic-type elements (such as a "go to", branch or other flow specifier) providing a system in which the logic by which a call is processed is stored in a script file (rather than, e.g., in the engine or program itself) allowing new scripts to be created, modified or deleted without having to interrupt the computer and stop taking calls and without requiring re-compilation. Preferably the system is configured to answer incoming phone calls and perform different services for each call wherein even when there is a problem with a call on one channel, processing of a different call of another channel can continue without interruption.

By providing a system permitting remote job applicants to complete a job application procedure in real time from a remote location, the system avoids discouraging applicants, reduces time and other resources used in obtaining and processing job applications, even when the job application processes are tailored to specific jobs, provides consistency and compliance with legal and company policies and provides real time involvement of applicants.

DETAILED DESCRIPTION OF THE PREFERRED EMBODIMENTS

The present invention can be implemented in a context where a telecommunications procedure involves the use of a telephone system. Accordingly, before describing embodiments of the present invention certain features found in previous telephone-based systems will be described.

One telephone-based system involves a simple survey application running on a standard interactive voice response (IVR) system such as a system with a personal computer, equipped with a "voice card" coupled to a telephone system. This previous application is written like a standard computer application in which both the prompts played and logic are predefined in a compiled computer program. Prompts (e.g. welcome messages, leave message, close, number of questions, order of questions and the like) are predefined and, in this system, cannot be changed, without modifying and then recompiling the source code. Typically, in order to achieve such modification, the old application must be stopped in order to replace it with the new application. In such a system, it is not possible to handle a new incoming call with a new or revised application at the same time that the system is still handling a previous call with the old (premodification) application.

Examples of this type of application include phone answering systems that are provided for home or home office use on many standard personal computers. Such applications permit recording custom messages into mail boxes that are played by the answering machine software. These applications typically have a predefined order determining how they work, including the number of options that are available. In many cases, the software manufacturer may add enhancements to the system over time and offer upgrades to users. This system is thus limited in that, to accommodate different uses, all possibilities must be thought of ahead of time and programmed into the system. Such a system is thus static in the sense that both logic and prompts played are unchangeable without making modifications to the source code. In such a system, changing the order of questions, the number of questions, the number of DTMF characters accepted or the like requires a programming change.

Another example is a previous survey system which provides a certain amount of dynamic performance running on a standard IVR system. This application is configured such that the logic is predefined in a compilable computer program but questions, (welcome messages, leave messages, close messages) are stored in a data file and the messages can be changed without recompiling the source code. However, in this system, when it is desired to change the logic or flow of the application, or the number of questions asked, it is necessary to modify and recompile the source code.

Figure 1:
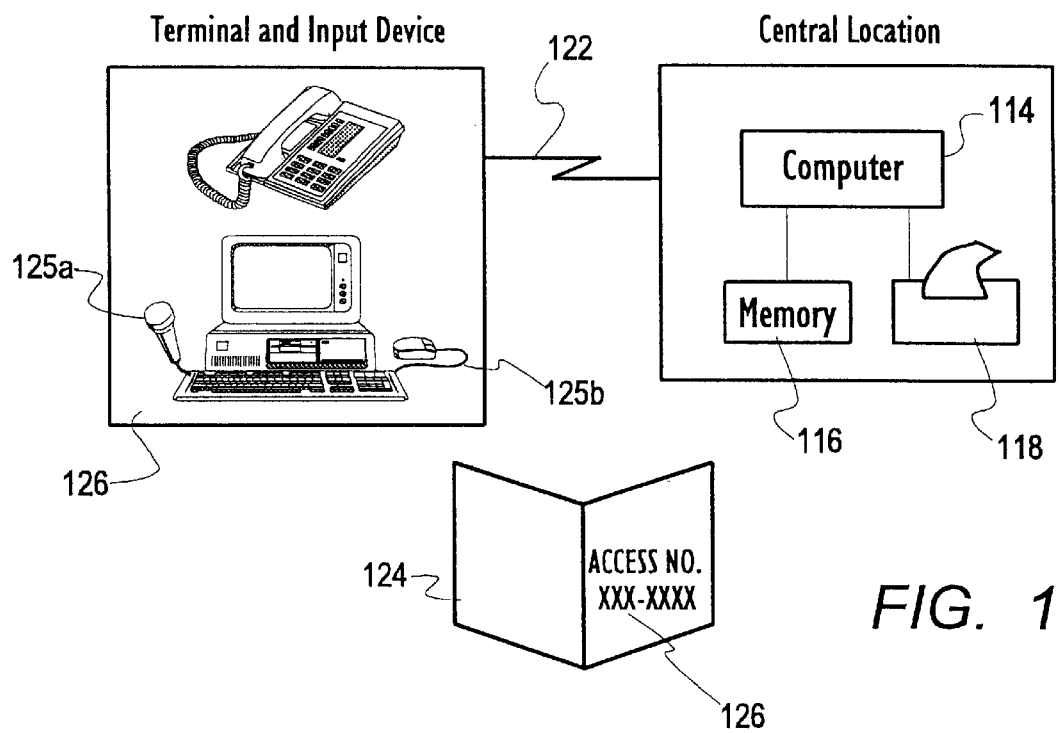
FIG. 1 is a schematic block diagram of a system for use in a job application procedure according to an embodiment of the present invention.
Figure 2:
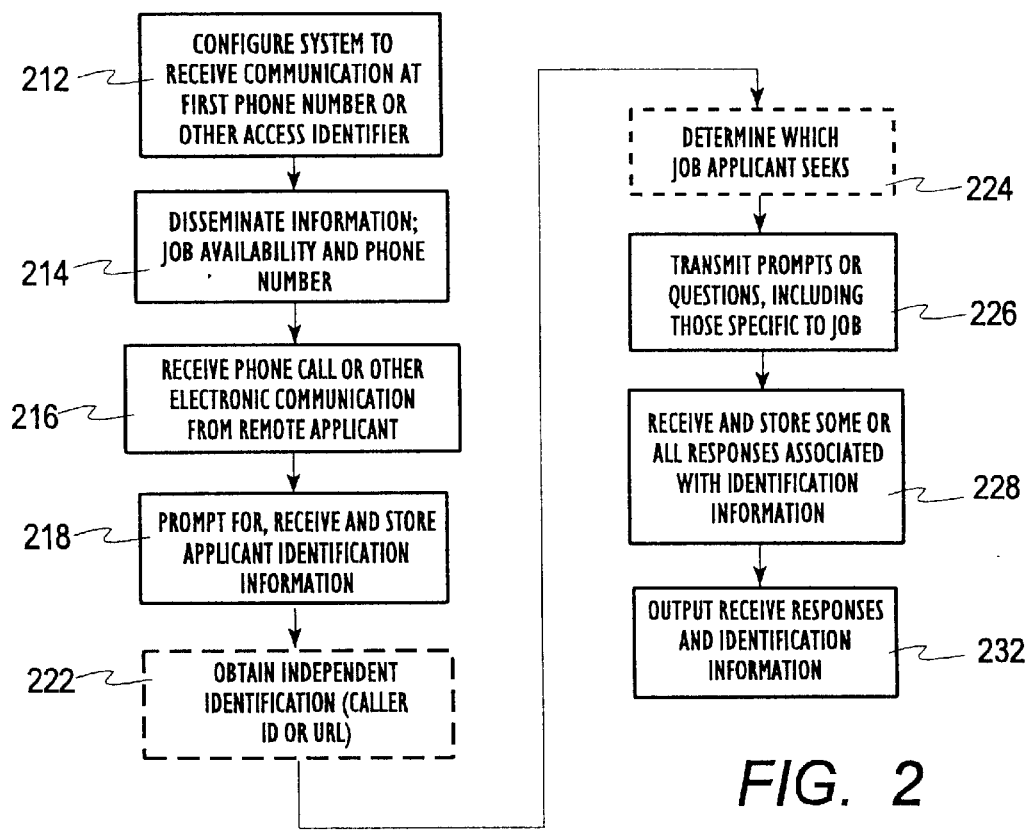
FIG. 2 is a flow chart depicting a job application procedure according to an embodiment of the present invention.

With this context, embodiments of the present invention will now be described. The procedure will be described with respect to both FIGS. 1 and 2. In the embodiment depicted in FIG. 1, a central location 112 is provided with one or more computers 114 coupled to one or more memory devices 116 such as disk memories or other well known memory devices. The computer 114 is also coupled to an output device such as a printer 118. The computer 114 is configured 212 (e.g. by incorporating a modulator-demodulator or "modem") to receive electronic telecommunication over a telecommunication link 122 such as a telephone line and the like.

In the depicted embodiment, the job application procedure with respect to a particular applicant and job is initiated by the applicant. In order to facilitate this procedure, the employer, employment agency or the like disseminates information 214, (e.g. by advertising in various media, such as, for example, newspaper advertising 124), which may include an access number for the telecommunication link 122, such as the telephone number 126 by which an applicant may initiate a job application procedure. For example, an employer, in this embodiment, may place a newspaper ad listing various available jobs, possibly with details such as location and description of job qualifications desired or required for applicants and the like, and a different telephone number for each job being offered. Alternatively, there may be a central telephone number applicable to a number of different jobs, preferably with the applicant being given an opportunity (as described below) to select one or more jobs for which the applicant wishes to apply.

An applicant who learns of the job being advertised and the associated telephone number, via the above described advertisement or otherwise, can then initiate the job application procedure by dialing the telephone number. Preferably the computer 114 is configured to receive job application communications at any time and accordingly an applicant may initiate the procedure at the applicant's convenience, to accommodate the applicant's schedule. As one example, an applicant who currently works during normal working hours can apply for a job during nighttime or weekend hours, thus being able to achieve a real time job application procedure without the need to take time off from a current job. Additionally, the applicant can achieve a real time job application procedure at the remote location, such as a location convenient to the applicant, thus without requiring the applicant to travel to a central location for the initial job application procedure.

When the applicant places a call using the applicant's remote terminal and input device 126, such as a telephone the computer 114 at the central location 112 receives the phone call 216 from the remote applicant. A system for call handling which may be used in the depicted embodiment is described more thoroughly below. However, regardless of the type of call handling procedures used, the computer 114 at the central location preferably prompts the user to provide information to identify the job applicant 218 such as requesting the job applicant to provide his or her name, address, telephone number or the like. If desired, the system may be configured to receive and store an identifying designation such as a social security number or other identifying number which is already associated with or assigned to the applicant. In this way, when the central location is configured to potentially receive multiple calls from the same applicant (e.g. where the central location is a employment agency) the applicant, in subsequent calls, may input only a identifier number so that the system 112 can recall name, address or other identifying information from memory (possibly prompting for verification of identity information) without requiring the applicant to re-input such information. The system can skip (or verify) other type of previously-input information (such as applicant's educational history, age and the like). This procedure may assist in reducing the amount of data entry required when multiple calls from a given applicant are contemplated.

When data is received from an applicant over a telephone system, the data will typically be provided as DTMF ("touch tone") inputs using the telephone keypad or as audio information. It is contemplated that, typically, information such as name and address will be provided as audio information. Audio information received over a telephone line from an applicant will typically be stored, as least temporarily, in memory 116 as an audio file, typically a compressed audio file using any of a number of audio storage protocols known to those of skill in the art. In one embodiment, some audio responses, especially those of a "yes/no" or other simple response nature, may be processed by a voice recognition routine so that certain responses may be stored as the content or meaning of the audio information rather than as audio files (e.g. when a "yes" audio response is received, the response may be processed and stored as a logical "true"). When audio responses are stored as audio files, the system at the central location 112 may be configured to provide for or assist in transcribing such audio files into written form for storage as text files or the audio files may be provided as part of the output of summary given to a decision maker e.g. for playback as an audio file at a computer work station or PC terminal of the person in the company making decisions about hiring job applicants.

In some situations, the central location 112 may receive independent identification information 122, such as caller ID information. If desired this information may be stored and/or may be used in identifying or helping to identify the caller (e.g. to permit the system to skip or merely verify applicant identification information and other information as described above in connection with an identification number embodiment). Automatic caller identification information 222 may also be useful in contacting an applicant where applicant identification information 218 is lost or indecipherable.

Although, as noted above, it is possible to provide an embodiment in which a different telephone number is associated with each different job, in other embodiments it is possible to use a single telephone number for handling calls applying for any of a number of different jobs. In this case, the applicant may be prompted to provide a response (audio or DTMF) indicating which type of job the applicant is seeking or which particular job the applicant is seeking 224.

As described more thoroughly below, the system preferably contains in memory 116 a set of questions or prompts associated with a particular job which the applicant is seeking. Also as described more thoroughly below, in some situations the number, type or order of questions involved in the application procedure may depend on the circumstances (such as previous answers to questions or prompts, the location from which the applicant is calling, e.g. as indicated by an area code or other circumstances). In any case the central location 112 provides such prompts or questions, specific to a particular job to the applicant 226. It is contemplated that, typically, this will involve playing back certain prerecorded or generated audio messages over the telephone link 122. Although the system is configured to permit tailoring of questions and logic to a particular job, it is possible that, in some circumstances, some or all questions or logic may be common to two or more jobs. For example, it may be desired to first provide a standard series of questions e.g. involving education, citizenship, experience and the like before prompting for information specific to a particular job. If desired, the system can be configured to provide a first type of job application procedure (which may be common to two or more jobs) in response to an initial call from an applicant and to provide for more job-specific questions or prompts in a later interview or portion of the interview either in the same telephone call or in a later telephone call (which may be a call back initiated from the central location).

In response to the questions or prompts provided by the central system 226, the applicant 126 will provide responses which may be in the form of DTMF responses or audio responses and the central location 112 will receive and store some, or preferably all, such responses, including preferably recording all DTMF responses 228. The response information is stored in a fashion such that it is or can be associated with the identification information.

In order for the information provided during the job application procedure to be used in making hiring decisions, the information is output in a fashion to facilitate review by the hiring personnel or other decision maker. Preferably the output is provided in a fashion which is perceptible to humans such as written or graphical form. As noted above, some input from a user may include DTMF signals corresponding to digits 1 through 0. Preferably, the output provided to the decision maker includes information indicative of the content of the information rather than the raw DTMF digits. For example, if a prompt asks a user to press "1" if he is a U.S. citizen or "2" if he is not a U.S. citizen, preferably the output will include "U.S. citizen" or "not U.S. citizen" (rather than "1" or "2", which would require the decision maker to consult a response key to discern the meaning of "1" or "2").

It is possible to output all information received from all applicants for a given job. It is also possible to provide only selected information. For example, it may be desired to provide the decision maker only with information indicative of educational background and experience and to withhold from the decision maker information such as names of applicants (which might indicate gender or other information which is not to be considered by the decision maker in hiring). It is also possible to output to the decision maker information on fewer than all of the applicants, e.g. when the responses of some applicants indicate they do not possess minimum educational, experience or other qualifications deemed necessary for a job.

Information may be output in a variety of forms. Information may be output in printed form, e.g. using a printer 118. Information may be output in electronic form, e.g. in the form of an electronic or video display at a PC of a decision maker. Some or all information may be provided in audio form, e.g. by playing back stored audio responses of an applicant, recorded as described above. Information may combine a number of the formats such as printed information, video display information and audio playback information. It is also possible to automate an initial portion of hiring decisions. For example, rather than outputting results of an initial applicant call, call backs to applicants who have at least minimum requirements may be automatically or partially automatically initiated, e.g. inviting or soliciting entry into a next phase of the application process (which may include an additional automated or semi-automated telephone or other electronic interview, personal interview, a written form or the like).

Figure 3:
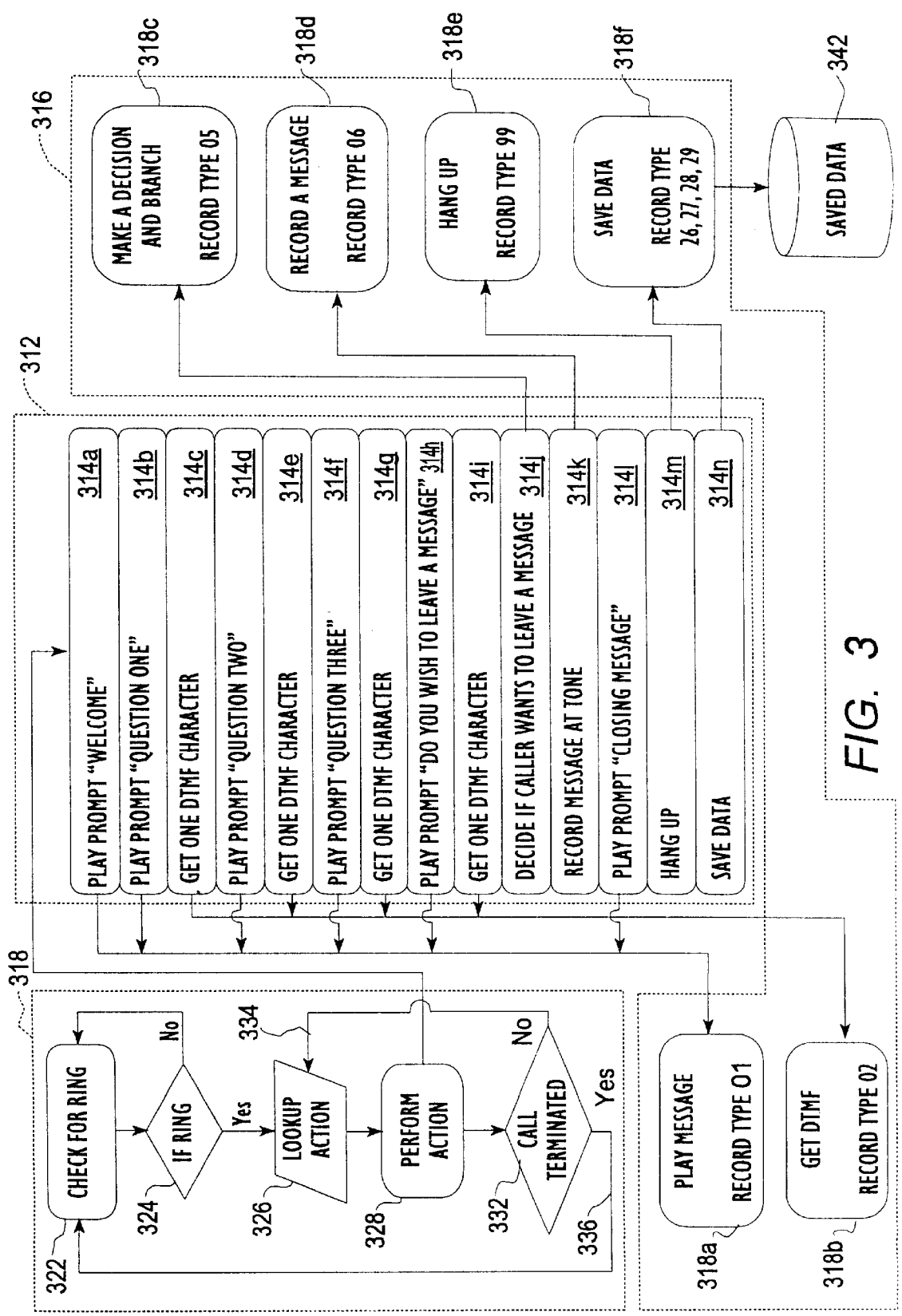
FIG. 3 is a flow chart depicting one example of call handling according to an embodiment of the present invention.
Figure 4:
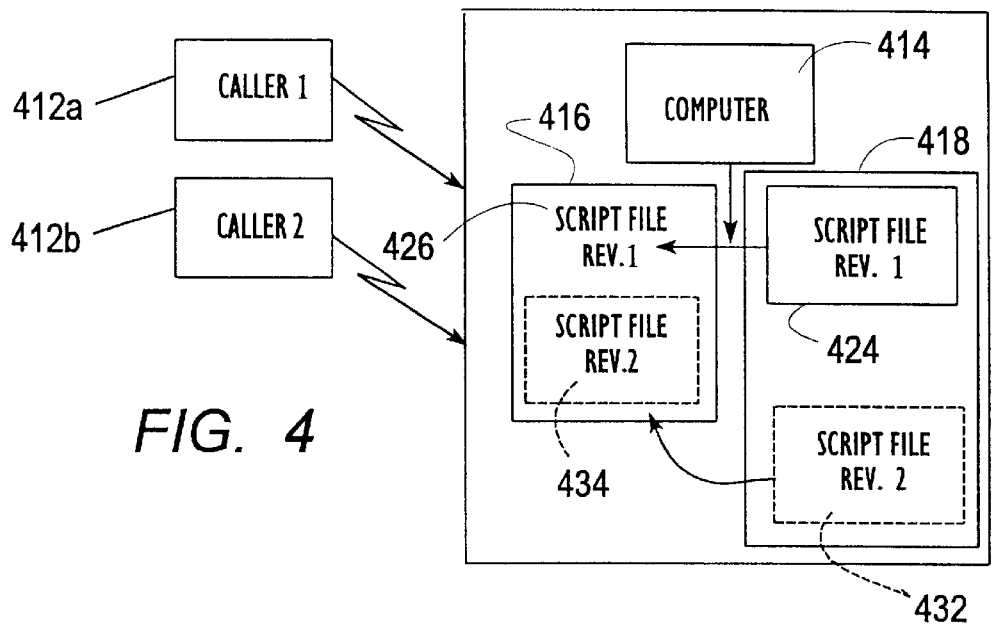
FIG. 4 is a block diagram showing a system for call handling to accommodate script revision.
Figure 5:
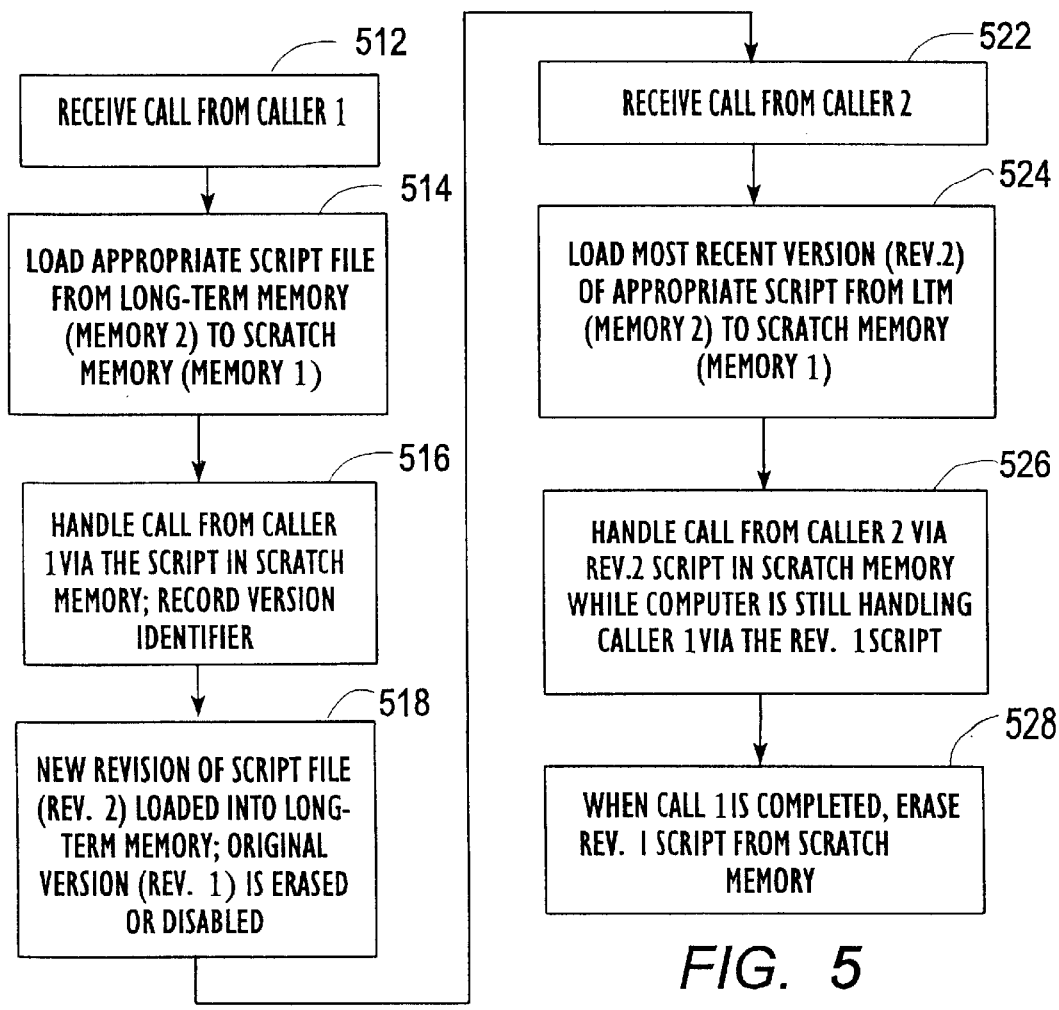
FIG. 5 is a flow chart depicting a procedure involving call handling where script revision occurs.

A number of procedures and systems can be used in connection with providing prompts and receiving responses specific to particular job situations, some of which are depicted in FIGS. 3–5. In the example of FIG. 3, three types of components are depicted: a script file 312, which contains a plurality of script elements 314a–314h, a plurality of execution modules 316 containing, in the depicted embodiment, individual modules 318a–318f, and an engine 318. Each element 314 of the script file 312 is associated with one of a plurality of script file record types which may be identified by a type number. Table I shows an example of a number of record types which can be used according to an embodiment of the present invention. Of particular note is the fact that, in the depicted system, the script record types include both (a) record types for playing and receiving information such as playing and receiving audio information and/or receiving DTMF information (e.g. record types 01, 02, 03, 06, 07) and (b) record types which can result in changing the flow (or sequence or logic) of call handling, e.g. record types 5 and 10 (as well as other record types).

TABLE I

RECORD TYPES

01 Play a Prompt or message file
02 Get DTMF from the caller
03 Play a sequence of numbers
04 Save a value to a variable
05 Test a variable for a given value and branch to a record in the SEQUENCE database
06 Record the caller's message
07 Play a date
08 Open a file
09 Close a file
10 Branch to a different point in the SEQUENCE file
11 Save and internal variable to a database field
12 Append a blank record to a database
13 Standard routine for saving pre-defined information to a variable
14 Standard Routine for retrieving a value from a database and storing it to and internal variable
15 Standard routine for seeking a value in a database Also of particular note is the fact that the engine 318 is configured so that it operates in the same fashion on all the record types, i.e. there is no need to change or recompile the engine 318 when a script file 312 is changed. In particular, in the embodiment of FIG. 3, after initially checking for a ring 322, 324 to determine that a incoming call has occurred execution steps 326, 332 handle script elements. Specifically, the engine 318 looks up the action 326, i.e. determines the record type for the script file element or record, performs an action corresponding to the record type 328, e.g. by calling one of the modules or subroutines 316 corresponding to the record type, and then determines whether the call is terminated 332. If the call is not terminated, the flow loops 334 to repeat the execution procedure steps 326–332. If the call has terminated the procedure returns 336 to listen for the next incoming call. In the embodiment of FIG. 3, once a call is received the engine 318 will begin at the entry or initial point of the script file 312 and, using procedure 326, will determine that the first record 314a (in the depicted example) is record type 01, i.e. a record type to play a prompt or message file. The engine 318 then performs the appropriate action 328 by calling the module 318a corresponding to record type 01 which is a "play message" module. The "play message" module 318a is passed a parameter from the first element 314a of the script file 312 which includes an indication of which message is to be played by module 318a. In this case, the parameter indicates that a "welcome" message is to be played and the appropriate sound file is retrieved from memory and played by module 318a. The flow returns from subroutine or module 318a and, when the engine 318 determines that the call has not terminated 332, it loops 334 to look up the next action. In this case, the next item in the script file 314b, is also record type 01 but, in this case, the parameter passed to module 318a causes playback of prompt question 1.

Following handling of the second script file record 314b by the engine execution items 324, 328,332, the engine then looks up the action 326 for the next item in the script file 314c. In this case, the record 314c has record type 02 and, accordingly the engine 318 causes the "perform action" step 328 to call to a different module 318b associated with record type 02, causing the system to receive one DTMF character and store it in memory. The next six items in the script file 314d, 314e, 314f, 314g, 314h, 314i are handled in a similar fashion, causing the system to play a second prompt and get a second DTMF character, play a third prompt and get a third DTMF character, play a fourth prompt and get a fourth DTMF character. In the depicted example, the fourth prompt asks whether the user wishes to leave a message. The engine 318 then performs a look up action 326 with respect to the tenth element or record of script file 314j and determines that it is of record type 5. Accordingly, the engine 318 executes a "perform action" step 328 resulting in a call to module or subroutine 318c associated with the record type 5.

Unlike previous record types in this example, record type 5 does not play or receive data to or from the caller. Rather, record type 5 tests or determines the value of a variable, such as a previously received DTMF character, and may, in response, perform a branch. One manner of performing a branch is to store a variable or to otherwise control which record or element of the script file 312 will next be processed by the execution steps 326, 328, 332 of the engine 318. For example, if the user was prompted to enter a "1" DTMF character, if the caller wishes to leave a message and a "2" DTMF character if the caller does not wish to leave a message, execution of module 312d, 312c will be configured (and passed parameters) such that it will determine whether the DTMF character received and stored in response to script file 314i was a "1". If the DTMF character was not a 1, module 318c will cause the engine 318 to perform the next look-up action 326 on the twelveth (rather than the eleventh) record or element of the script file 312, thus skipping element or record eleven 314k of the script file 312. On the other hand, if module 318c determines that the caller provided a "1" DTMF character in response to the prompt provided at record 314h, the result of module 318c will be that the next record or element of the script file 312 processed by the engine 318 will be the eleventh element 314k which will result in the engine 318 calling the module 318d associated with the record type of record eleven (which is record type 06), causing the system to record a message from the caller. Similar handling of the remaining records causes the system to play a "closing message prompt" 314l and hang up 314m before saving the data 314h e.g. into a disk file 342. In this way, it is possible to not only change the number and contents of messages played to or received from the caller by modifying, adding or deleting script file records, but also to change the logic, i.e. the sequence or flow, preferably in a dynamic and interactive fashion, i.e. in response to the content of information received from the caller (or lack thereof) also by adding, deleting or modifying script file elements or records. Since script file elements or records are all handled by the same steps 326, 328, 332 of the engine 318, changes in logic, number or type of items played or received can be changed without recompiling since only the engine 318 and, possibly the modules 318 requires compilation before execution. This means, as a practical matter, it is feasible for end users to modify the system, including its logic and flow, by editing a script file, e.g. using a database editor, text editor or the like, and it is not necessary to have these actions performed by a computer programmer nor is it necessary to recompile the system or any part thereof following such a modification.

Although FIG. 3 depicts script file records in operative fashion, typically a script file will be configured such that each element has a number of fields or components which may be stored in a fixed-field or delimited fashion, preferably similar to a database storage system. Table IIA, IIB, and IIC provide examples of script files that may be used according to embodiments of the present invention.

EXAMPLE 1  TABLE II-A

| ORDER | TYPE | VOICE FILE | TERM | TIME | SIL | TERM | DIGITS | ON | GOTO | LOW DIGITS | HIGH DIGITS | ALIAS | VARIABLE | COMMENT |
|---|---|---|---|---|---|---|---|---|---|---|---|---|---|---|
| 1 | 01 | 9094.SPC | @ | 60 | 5 | 2 | 0 | 0 | 0 | 0 | 0 | | | Enter Extension Now |
| 2 | 02 | | | 5 | 5 | 3 | 2 | 0 | 1 | 10 | 99 | | pacR27 | Accept Extension |
| 3 | 04 | 7519 | | 0 | 0 | 4 | 0 | 0 | 0 | 0 | 0 | | pacjob | Save job Number |
| 4 | 01 | 5399.SPC | @ | 60 | 5 | 5 | 0 | 0 | 0 | 0 | 0 | | | Accept Extension |
| 5 | 01 | 13118.SPC | @ | 60 | 5 | 6 | 0 | 0 | 0 | 0 | 0 | | | Flight Attendant Job Description |
| 6 | 01 | 511.SPC | @ | 60 | 5 | 7 | 0 | 0 | 0 | 0 | 0 | | | Instructions |
| 7 | 01 | 631.SPC | @ | 60 | 5 | 8 | 0 | 0 | 0 | 0 | 0 | | | Instructions |
| 8 | 20 | | | 0 | 0 | 12 | 0 | 0 | 0 | 0 | 0 | | | Get SSN |
| 12 | 01 | 540.SPC | @ | 60 | 5 | 13 | 0 | 0 | 0 | 0 | 0 | | | Instructions |
| 13 | 01 | 632.SPC | @ | 60 | 5 | 150 | 0 | 0 | 0 | 0 | 0 | | | Instructions |
| 150 | 04 | 27695 | | 0 | 0 | 151 | 0 | 0 | 0 | 0 | 0 | | pacQ1 | Save Question Number to pacQ1 |
| 151 | 01 | 27695.SPC | | 60 | 5 | 152 | 1 | 0 | 150 | 1 | 2 | | pacR1 | Question 1 - 27695 |
| 152 | 02 | | | 5 | 5 | 250 | 1 | 0 | 0 | 0 | 0 | | pacR1 | Question 1 - 27695 |
| 250 | 04 | 21681 | | 0 | 0 | 251 | 0 | 0 | 0 | 0 | 0 | | pacQ2 | Save Question Number to pacQ2 |
| 251 | 01 | 27681.SPC | | 60 | 5 | 252 | 1 | 0 | 150 | 1 | 2 | | pacR2 | Question 2 - 27681 |
| 252 | 02 | | | 5 | 5 | 253 | 1 | 0 | 0 | 0 | 0 | | pacR2 | Question 2 - 27681 |
| 253 | 30 | 353.SPC | | 5 | 5 | 350 | 1 | 0 | 9500 | 0 | 0 | YN | pacR1 | Question 1 - Check for knockout |
| 350 | 04 | 21682 | | 0 | 0 | 351 | 0 | 0 | 0 | 0 | 0 | | pacQ3 | Save Question Number to pacQ3 |
| 351 | 01 | 21682.SPC | | 60 | 5 | 352 | 1 | 0 | 250 | 1 | 2 | | pacR3 | Question 3 - 27682 |
| 352 | 02 | | | 5 | 5 | 353 | 1 | 0 | 0 | 0 | 0 | | pacR3 | Question 3 - 27682 |
| 353 | 30 | 353.SPC | | 5 | 5 | 450 | 1 | 0 | 9500 | 0 | 0 | YN | pacR2 | Question 2 - Check for knockout |
| 450 | 04 | 21691 | | 0 | 0 | 451 | 0 | 0 | 0 | 0 | 0 | | pacQ4 | Save Question Number to pacQ4 |
| 451 | 01 | 29697.SPC | | 60 | 5 | 452 | 1 | 0 | 350 | 1 | 2 | | pacR4 | Question 4 - 27697 |
| 452 | 02 | | | 5 | 5 | 453 | 1 | 0 | 0 | 0 | 0 | | pacR4 | Question 4 - 27697 |
| 453 | 30 | 353.SPC | | 5 | 5 | 550 | 1 | 0 | 9500 | 0 | 0 | YN | pacR3 | Question 3 - Check for knockout |
| 8000 | 21 | | | 0 | 0 | 8001 | 0 | 0 | 0 | 0 | 0 | | | Get Home Phone |
| 8001 | 22 | | | 0 | 0 | 8002 | 0 | 0 | 0 | 0 | 0 | | | Get Work Phone |
| 8002 | 25 | | | 0 | 0 | 8003 | 0 | 0 | 0 | 0 | 0 | | | Get Caller's Zip Code |
| 8003 | 23 | | | 0 | 0 | 8004 | 0 | 0 | 0 | 0 | 0 | | | Get Caller's Name |
| 8004 | 24 | | | 0 | 0 | 9000 | 0 | 0 | 0 | 0 | 0 | | | Get Caller's Address |
| 9000 | 04 | Y | | 0 | 0 | 9001 | 0 | 0 | 0 | 0 | 0 | | pacComplt | Application Completed |
| 9001 | 01 | @ | | 60 | 5 | 9500 | 0 | 0 | 0 | 0 | 0 | | | Company Closing |
| 9500 | 99 | | | 0 | 0 | 9900 | 0 | 0 | 0 | 0 | 0 | | | Hangup |
| 9900 | 26 | @ | | 0 | 0 | 9901 | 0 | 0 | 0 | 0 | 0 | | | Save Information to STATS.DBF |
| 9901 | 21 | @ | | 0 | 0 | 9902 | 0 | 0 | 0 | 0 | 0 | | | Save Information to ASPLFILE.DBF |
| 9902 | 28 | @ | | 0 | 0 | 9903 | 0 | 0 | 0 | 0 | 0 | | | Save Information to DUPAPPS.DBF |
| 9903 | 29 | @ | | 0 | 0 | 9999 | 0 | 0 | 0 | 0 | 0 | | | Savt Information to PREV.DBF |
| 9999 | | @ | | 0 | 0 | | 0 | 0 | 0 | 0 | 0 | | | End of job |

EXAMPLE 2   TABLE II-B

| ORDER | TYPE | VOICE FILE | TERM | TIME | SIL | ON TERM | DIGITS | ON | GO-TO | LOW DIGITS | HIGH DIGITS | ALIAS | VARIABLE | COMMENT |
|---|---|---|---|---|---|---|---|---|---|---|---|---|---|---|
| 1 | 01 | 5487.SPC | @ | 60 | 5 | 2 | 0 | 0 | 0 | 0 | 0 | | | Company Introduction |
| 2 | 20 | | | 0 | 0 | 0 | 0 | 0 | 0 | 0 | 0 | | | Get SSN |
| 3 | 01 | 5476.SPC | @ | 120 | 5 | 4 | 0 | 0 | 0 | 0 | 0 | | | Play Long Introduction |
| 4 | 23 | | | 0 | 0 | 5 | 0 | 0 | 0 | 0 | 0 | | | Get Name |
| 5 | 25 | | | 0 | 0 | 6 | 0 | 0 | 0 | 0 | 0 | | | Get Zip Code |
| 6 | 24 | | | 0 | 0 | 7 | 0 | 0 | 0 | 0 | 0 | | | Get Address |
| 7 | 21 | | | 0 | 0 | 9000 | 0 | 0 | 0 | 0 | 0 | | | Get Phone Number |
| 9000 | 04 | Y | | 0 | 0 | 9001 | 0 | 0 | 0 | 0 | 0 | | pacComplt | Completed Application |
| 9001 | 01 | 64174.SPC | @ | 60 | 5 | 9500 | 0 | 0 | 0 | 0 | 0 | | | Play Closing |
| 9500 | 99 | | @ | 60 | 5 | 9900 | 0 | 0 | 0 | 0 | 0 | | | Hangup |
| 9900 | 26 | | @ | 0 | 0 | 9001 | 0 | 0 | 0 | 0 | 0 | | | Save Information to STATS.DBF |
| 9901 | 27 | | @ | 0 | 0 | 9902 | 0 | 0 | 0 | 0 | 0 | | | Save Information to APPLFILE.DBF |
| 9902 | 28 | | @ | 0 | 0 | 9903 | 0 | 0 | 0 | 0 | 0 | | | Save Information to DUPAPFS.DBF |
| 9903 | 29 | | @ | 0 | 0 | 9999 | 0 | 0 | 0 | 0 | 0 | | | Save Information to PREY.DBF |
| 9999 | | | @ | 0 | 0 | 9999 | 0 | 0 | 0 | 0 | 0 | | | End of job |

TABLE II-C

| ORDER | TYPE | VOICE FILE | TERM | TIME | SIL | ON TERM | DIGITS | ON | GOTO | LOW DIGITS | HIGH DIGITS | ALIAS | VARIABLE | COMMENT |
|---|---|---|---|---|---|---|---|---|---|---|---|---|---|---|
| 01 | 01 | 509.SPC | @ | 60 | 5 | 2 | 0 | 0 | 0 | 0 | 0 | | | Thank you for your interest in |
| 02 | 01 | 1533.SPC | @ | 60 | 5 | 3 | 0 | 0 | 0 | 0 | 0 | | | Day Warehouse Worker |
| 03 | 01 | 11583.SPC | @ | 60 | 5 | 4 | 0 | 0 | 0 | 0 | 0 | | | Day Warehouse Worker job description |
| 04 | 01 | 511.SPC | @ | 60 | 5 | 5 | 0 | 0 | 0 | 0 | 0 | | | Instructions |
| 05 | 01 | 631.SPC | @ | 60 | 5 | 6 | 0 | 0 | 0 | 0 | 0 | | | Instructions |
| 06 | 20 | | | 0 | 0 | 7 | 0 | 0 | 0 | 0 | 0 | | | Get SSN |
| 07 | 21 | | | 0 | 0 | s | 0 | 0 | 0 | 0 | 0 | | | Get Home Phone |
| 08 | 22 | | | 0 | 0 | 9 | 0 | 0 | 0 | 0 | 0 | | | Get Work Phone |
| 09 | 25 | | | 0 | 0 | 10 | 0 | 0 | 0 | 0 | 0 | | | Get Caller's Zip Code |
| 10 | 23 | | | 0 | 0 | 11 | 0 | 0 | 0 | 0 | 0 | | | Get Caller's Name |
| 11 | 24 | | | 0 | 0 | 12 | 0 | 0 | 0 | 0 | 0 | | | Get Caller's Address |
| 12 | 01 | 540.SPC | @ | 60 | 5 | 13 | 0 | 0 | 0 | 0 | 0 | | | Instructions |
| 13 | 01 | 632.SPC | @ | 60 | 5 | 150 | 0 | 0 | 0 | 0 | 0 | | | Instructions |
| 150 | 04 | 28214 | | 0 | 0 | 151 | 0 | 0 | 0 | 0 | 0 | | pacQ1 | Save Question Number to pacQ1 |
| 151 | 01 | 29214.SPC | | 60 | 5 | 152 | 1 | 0 | 0 | 0 | 0 | | | Question 1 - 28214 |
| 152 | 02 | | | 5 | 5 | 250 | 1 | 0 | 150 | 1 | 2 | | pacR1 | Question 1 - 28214 |
| 250 | 04 | 18729 | | 0 | 0 | 251 | 0 | 0 | 0 | 0 | 0 | | pacQ2 | Save Question Number to pacQ2 |
| 251 | 01 | 18729.SPC | | 60 | 5 | 252 | 1 | 0 | 0 | 0 | 0 | | | Question 2 - 18729 |
| 252 | 02 | | | 5 | 5 | 350 | 1 | 0 | 150 | 1 | 5 | | pacR2 | Question 2 - 28179 |
| 350 | 04 | 18727 | | 0 | 0 | 351 | 1 | 0 | 0 | 0 | 0 | | pacQ3 | Save Question Number to pacQ3 |
| 351 | 01 | 18727.SPC | | 60 | 5 | 352 | 1 | 0 | 0 | 0 | 0 | | | Question 3 - 18727 |
| 352 | 02 | | | 5 | 5 | 9000 | 1 | 0 | 250 | 1 | 2 | | pacR3 | Question 3 - 18727 |
| 9000 | 04 | Y | | 0 | 0 | 9001 | 0 | 0 | 0 | 0 | 0 | | pacComplt | Application Completed |
| 9001 | CI | 64045.SPC | @ | 60 | 5 | 9500 | 0 | 0 | 0 | 0 | 0 | | | Company Closing |
| 9500 | 99 | | @ | 0 | 0 | 9900 | 0 | 0 | 0 | 0 | 0 | | | Hangup |
| 9900 | 26 | | @ | 0 | 0 | 9901 | 0 | 0 | 0 | 0 | 0 | | | Save Information to STATS.DBF |
| 9901 | 27 | | @ | 0 | 0 | 9902 | 0 | 0 | 0 | 0 | 0 | | | Save Information to APPFILE.DBF |
| 9002 | 29 | | @ | 0 | 0 | 9999 | 0 | 0 | 0 | 0 | 0 | | | Save Information to PREV.DBF |
| 9999 | | | @ | 0 | 0 | 9999 | 0 | 0 | 0 | 0 | 0 | | | End of job |

As seen in these examples, tables IIA, B, and C contain a number of fields indicated by the column headings in Tables IIA, B, and C. In some cases, the use of information in a particular field depends on the record type. The "order" field provides a number indicating an initial order for the records in the script file with the records with lower numbers occurring before those with higher numbers. As described above, the system is configured so that branches may occur, i.e. such that, depending on circumstances, some or all records may be executed out of order, i.e. in an order other than that indicated by the order number. In one embodiment, the order number also acts as a record label so that a branch procedure can identify the record to which a branch is made by its order number. Preferably the system is configured such that, in the absence of a branch or other flow control, execution of any script file record will be followed by the record with the next-higher order number.

A "voice file" column, for example, record type 01, provides an address or other identifier of a storage location for a file containing a message to be played. In the case, of for example, record type 04, the "voice file" column can be used to indicate a value to be stored.

The "term" field designates a termination character which may be used by the caller to, for example, indicate that the caller has finished inputting audio for an audio response. In one embodiment, a particular entry in the "term" field may be used to indicate that any DTMF character input by the caller will act as a termination character.

The "time" field can be used to designate, for example, the amount of time allotted for an audio response for the amount of time allotted to play an audio file.

The "SIL" field designates the length of time of silence (or minimum level) audio which will result in a response by the system. For example, the system can be configured such that if the caller is silent for five seconds, the current audio recording will terminate or cause a new prompt to be played.

The "on term field" column designates a branch to be taken in the case of a time out or receipt of a termination character.

The "digit" field designates the number of digits which may be received or accepted from the caller in DTMNF format.

The "on" and "go to" fields indicate that, upon receipt of a digit designated in a "on" field, a branch should be made to the "go to" order number record.

The "low digits" and "high digits" fields indicate the lowest and highest values of DTMF inputs that are acceptable in response to a prompt.

The "alias" field may be used, if desired, for opening a non-standard database (e.g. a database used for appointment scheduling) and/or for testing.

The "variable" field provides a name of a variable in which information received may be stored.

The "comment" field is provided for entering descriptive information to assist in programming and is not used during execution.

One of the features preferably provided in the present invention is a configuration such that it is not necessary to terminate execution of a program or wait for completion of handling of a call in order to implement a program or logic revision or introduce a new script file. As shown in FIG. 4, the central location may be configured to simultaneously accept calls from two or more callers 412a, 412b such as when caller 2 places a call after a first call is received from caller 1 but before the first call has terminated. One manner of implementing the invention involves coupling a computer 414 to first and second memories 416, 418 (or first and second locations in a single memory). With reference to both FIGS. 4 and 5, when the system receives a call 512 from a first caller 412a, the computer 414 can control the memory 416 to load an appropriate script file from the second or long-term memory 424 so that a copy 426 resides in the first memory or "scratch" memory 416. (Rather than creating a second copy of the script file 424, 426, the procedure may also involve storing pointers to memory locations, as will be apparent to those of skill in the art.) The scratch copy of the script file 426 is then used for handling the call from caller 1 516. In one embodiment, in connection with handling the call, it may be desirable to store an indication of which script file or script file version was used in handling a particular call. If it is desired to revise the script file associated with a particular job, this may be accomplished by a process which includes storing a new revision script file 432 into the long-term or main memory 418 and preferably disabling or erasing the earlier version 424 from memory two 518 or making appropriate revisions to pointer variables, as will be apparent to those of skill in the art) Once this is accomplished, if another call has been received 522 from caller 2, 412b, even though caller 1 may still be in the process of having his or her call handled, caller 2 may still be handled according to the new or revised script. For example, in response to a call from caller 2 412b, the computer 414 may control the memory to load the most recent portion 432 of the script file 524 into the scratch memory 416 to provide a second copy or scratch copy 434 of the revised script file. The computer 414 can then handle the call from caller 2 412b (526) using the new or revised script 434 in scratch memory 416 at the same time that it is using the original version of the script file in scratch memory 426 for completing the handling of the call from the caller 1 412a. At the termination of handling the call from caller 1 412a, the script file 426 in scratch memory may be erased 528. Any new calls can then be handled using the revised script file 432, either loaded into scratch memory 416, as needed, or with the appropriate use of pointers.

FIGS. 4 and 5 illustrate not only how new script files can be implemented without requiring termination of processing on current calls or ending a running program, but also illustrate that there is a degree of segregation in connection with handling calls from different callers so that it is possible to configure the system such that even when there is a problem with handling of a first call (such as loss of signal, random memory or other computer error or the like), this will not necessarily affect handling of the second call, so the call processing can continue to operate even when there is such a problem with a first call.

In light of the above description, a number of advantages of the present invention can be seen. The present invention permits applicants to initiate a job application procedure at the time and location selected by and/or convenient to the applicant, without the need for waiting for or filling out written forms or accommodating the applicant's schedule to that of the company or company personnel and, for these and other reasons, avoids a situation in which an applicant who may otherwise be desirable or qualified is discouraged from applying for a job. The present invention reduces or eliminates the need for preparing written job application forms and/or training personal interviewers, reduces or eliminates the need for following an initial job application form or interview with a data entry or summary step and, for these and other reasons, reduces the time and other resource expenditures involved in a job application procedure, even when job application procedures are tailored to specific job or job requirements. The system facilitates implementation of procedures for providing consistency in the interview process so that all applicants may be handled in a similar or identical fashion, and are asked similar or identical questions and facilitates compliance with legal and company policy by asking the correct questions related to a particular job and avoiding asking improper questions. Such consistency in compliance with policy can be provided without the need for extensive training and supervision of personal interviewers. The present invention provides for real time interaction or involvement of an applicant so that the delay inherent in certain aspects of data entry or processing can be reduced or eliminated and interviewee performance in the context of real time limitations or pressures can be evaluated and an accurate indication of applicant response time can be provided. The system is preferably configured to record all or substantially all answers rather than, e.g., using answers only for on-the-fly processing and without recording answers of individual callers. The present invention is preferably configured to store answers in a manner associated with individual callers rather than, for example, accumulating statistics on answers without the ability to recover the association of a particular answer or set of answers with a given caller. The present invention permits a job application process to be readily and accurately tailored or configured to each different job so that all applicants for a given job may be asked pertinent questions. Some or all aspects of the described application procedure provide for data being gathered directly, i.e. such that DTMF or audio data provided by an applicant is immediately and directly stored in the central location computer i. e. without requiring an extra step of data entry, with the attendant delay, cost and potential for error. Because delay in data entry and other delays are reduced or eliminated, the system can be configured to provide rapid or immediate evaluation or ranking of applicants, e.g., so that the system can, at any time, for example, output a list of the ten most experienced applicants currently on file for a given job. By providing the ability to rapidly evaluate and make offers or hires, the system reduces the risk that a highly qualified applicant will take another job before the interviewing and evaluation and hiring process is sufficiently complete that an offer can be made.

According to one embodiment, the system provides a modular and dynamic procedure preferably capable of running on a standard IVR system. In one embodiment, the application is written in such a fashion that the logic of how the application is to process a call, the prompts that are played and the characters captured are contained within a script file. The system is able to answer incoming calls and perform different services for each call. Preferably the system isolates each call from every other call on the system so that if there is a problem with one call on a channel, it does not affect the call on another channel. Storing logic in a script file rather than in a program allows new scripts to be created, modified or deleted without having to interrupt the computer and stop taking calls.

A number of variations and modifications of the invention can be used. Although the present invention has been described in the context of a telephone telecommunication system, other telecommunication systems can also be used including cellular telephone systems, radio telephone systems, satellite communication systems, interactive television systems, cable systems, optical fiber systems, local area network (LAN) systems and/or Internet communications. For example, in the case of Internet communications, URLs may play some or all of the roles described above in connection with caller ID information and input may be via a keyboard or mouse or other computer input system, including computer audio input systems. Although a system involving audio and DTMF data has been described, it is possible to provide for a system which includes any or all of text or facsimile image data, digital or digitized text, logical, video or audio information and the like. In one embodiment, two different callers inquiring about two different jobs will be asked different sets of questions (although some of the questions may be in common). This is in contrast to, for example, a typical survey system where the goal is to provide identical questions to all respondents). On the other hand, when first and second callers are both inquiring about the same job, it is preferred in the present system, to configure the system so that both applicants are handled according to the same script, and asked substantially the same questions.

Although examples of procedures have been given, it is possible to use the invention with procedures which include fewer or more steps or which perform steps in different order. For example, in connection with the procedure depicted in FIG. 2, it is possible to transmit prompts specific to the job before receiving applicant identification information. It is possible to skip the receipt of applicant identification information, e.g., in situations which provide for caller ID or otherwise as desired. The system may be configured to facilitate later steps in a job application procedure such as by branching to an automated appointment database to allow a caller (e.g. those callers that meet minimum requirements) to schedule a personal interview.

It is in general possible to use some aspects of the invention without using others. For example, it is possible to use a job application system for remote applicants generally as described in connection with FIG. 2 without using the script file system as depicted in FIG. 3. Although as described, the interview procedure is initiated when the applicant places a telephone call, the system can be configured to provide for the central location 112 placing a call-back to the applicant, following such initial contact, e.g., to reduce or avoid toll charges to the applicant (based on a call back number provided by applicant in response to a prompt or using a caller ID telephone number). Although the description above has concentrated on job application questions and responses, the system 112 preferably also provides other information or services such as playing back a more complete description of the job, qualifications, location and the like, "courtesy" features such as greetings, closings and the like, offers to provide additional services such as mailings of information on this or other jobs, descriptions of the company, alternate telephone numbers such as for company product information or the like.

Although the application has been described by way of a preferred embodiment and certain variations and modifications, other variations and modifications can also be used, the invention being defined by the following claims.

What is claimed is:

1. A computer-implemented process for obtaining, at a central location, job-application information from remotely located applicants for jobs, the process comprising the steps of:
    a) providing, at said central location, at least a first computer configured to receive information over an electronic communications link, wherein said electronic communications link is accessible using at least a first identifier;
    b) disseminating information advising of the availability of a job application procedure by utilization of said electronic communications link in response to a communications link access using said first identifier;

c) establishing a substantially real-time communications link between at least a first of said applicants and said central location in response to said first applicant inputting said first identifier;

d) receiving, at said central location, information identifying said first applicant;

e) storing, in an electronic memory storage device coupled to said central location, said information identifying said first applicant;

f) transmitting a first series of prompts from said central location over said electronic communications link to said first applicant under control of said first computer, related to a first job wherein said first series of prompts is specific to said first job and is different from at least some prompts in a second series of prompts which is specific to a second, different job, wherein said first series of prompts are presented to said first applicant sequentially, and wherein said second series of prompts are not transmitted to said first applicant;

g) inputting, by said first applicant, responses to at least some of said prompts in said first series of prompts, said responses including at least some of said job-application information;

h) automatically transmitting, over said communications link, directly to said central location, data indicative of said plurality of responses input by said first applicant immediately after each response has been entered by said first applicant;

i) storing, in an electronic memory storage device coupled to said first computer, said data indicative of said plurality of responses wherein said storing is performed in a manner to permit said data indicative of said plurality of responses to be associated with said information identifying said first applicant; and j) outputting, from said central location, at least some of said job application information and said associated information identifying at least said first job applicant.

2. A computer-implemented process, as claimed in claim 1, further comprising:

repeating steps c) through i) with respect to a second job applicant for said first job, wherein at least a first plurality of prompts transmitted to said second job applicant are substantially identical to a corresponding plurality of said prompts transmitted to said first job applicant.

3. A computer-implemented process, as claimed in claim 1, wherein said step of outputting comprises outputting said job application information in a format permitting human perception of said job application information without the need for reference to a response key.

4. A computer-implemented process as claimed in claim 1, wherein said step of storing said data indicative of said plurality of responses comprises storing data indicative of all responses of said first job applicant.

5. A computer-implemented process as claimed in claim 1, further comprising:

establishing a substantially real-time communications link between at least a second of said applicants and said central location;

receiving at said central location information identifying said second applicant;

storing, in an electronic memory storage device coupled to said central location, said information identifying said second applicant;

transmitting said second series of prompts from a said central location over said electronic communications link to said second applicant under control of said first computer, related to said second job wherein at least some prompts in said second series of prompts transmitted to said second applicant are different from any of said prompts transmitted to said first applicant, and wherein said first series of prompts are not transmitted to said second applicant;

inputting by said second applicant responses to at least some of said prompts, said responses including at least some of said job application information;

automatically transmitting over said communications link, directly to said central location, data indicative of said plurality of responses input by said second applicant;

storing in an electronic memory storage device coupled to said first computer, said data indicative of said plurality of responses input by said second applicant wherein said storing is performed in a manner to permit said data indicative of said plurality of responses input by said second applicant to be associated with said information identifying said second applicant; and outputting from said central location, at least some of said job application information and said associated information identifying at least said second job applicant.

6. A computer-implemented process for obtaining, at a central location, job-application information from remotely located applicants for a particular job, the process comprising the steps of:

a) providing, at said central location, at least a first computer configured to receive both audio and keypress information over a telephone link, wherein said telephone link is accessible using a telephone number;

b) disseminating information advising of the availability of a job application procedure by dialing said telephone number;

c) establishing a telephone call between at least a first of said applicants and said central location in response to said first applicant inputting said telephone number at a first telephone keypad;

d) receiving, at said central location, information identifying said first applicant;

e) storing, in an electronic memory storage device coupled to said computer, said information identifying said first applicant;

f) transmitting a first series of audio prompts from said central location over said telephone link to said first applicant under control of said first computer, wherein at least some of said audio prompts are specific to said particular job and are different from at least some prompts in a second series of prompts which is specific to a second, different job, and wherein said second series of prompts are not transmitted to said first applicant;

g) inputting, by said first applicant, audio and keypress responses to at least some of said prompts after each of said prompts is received, said responses including at least some of said job-application information;

h) automatically transmitting, over said telephone link, directly to said central location, data indicative of said audio and keypress responses;

i) storing, in an electronic memory storage device coupled to said first computer, said data indicative of said audio and keypress responses, wherein said storing is performed in a manner to permit said data indicative of said audio and keypress responses to be associated with said information identifying said first applicant;

j) repeating steps c) through i) with respect to a second job applicant, wherein at least a first plurality of prompts transmitted to said second job applicant are substantially identical to a corresponding plurality of said prompts transmitted to said first job applicant; and k) outputting, from said central location, at least some of said job application information for at least one of said first and second applicants, and said associated information identifying said job applicant, said job application information being output in a format permitting human perception of said job application information without the need for reference to a response key.

7. A computer-implemented process for obtaining job application information in an automated fashion over a telephone link comprising:

providing, at a central location, at least a first computer configured to receive both audio and keypress information relating to a job over said telephone link established by a job applicant placing a telephone call;

storing in a memory, coupled to said first computer, a first plurality of script file elements each script file element being identified as one of a plurality of element types, at least one of said element types being a branch type for causing said script file elements to be processed out of order;

said computer being programmed with software to provide a script element processing procedure which includes performing a look-up to determine the type of action to be performed based on said element type and execution of a module corresponding to said element type configured to perform said action corresponding to said element type;

using said script element processing procedure to process elements of said script file, beginning with a first element in said script file and proceeding sequentially through said script file elements thereafter unless processing out of order is specified by a script file element of said branch type said processing of said script file elements providing a first series of prompts wherein said series of prompts is specific to a first job and is different from at least some prompts in a second series of prompts which is specific to a second, different job, wherein a first applicant for said first job is provided said first series of prompts but not said second series of prompts, wherein a second job applicant for said second job is provided with said second series of prompts but not said first series of prompts; and wherein, an end user can provide modified call processing to alter the logic of how said telephone call is processed, the messages to be played to said job applicant, the number of questions asked and the number of DTMF characters captured by making modifications to said script file and without requiring recompilation of said software.

8. A process as claimed in claim 7, wherein said script file includes at least one other script file element type selected from the group consisting of:

a type for playing a prompt;

a type for saving DTMF from a caller;

a type for playing a sequence of numbers;

a type for saving a value to a variable;

a type for recording audio messages from a caller;

a type for playing a date;

a type for opening a file;

a type for closing a file;

a type for testing a variable for a given value;

a type for saving an internal variable to a database field;

a type for appending a record to a database;

a type for saving predefined information to a variable;

a type for retrieving a value from a database; and a type for seeking a value in a database.

9. A process as claimed in claim 7, further comprising receiving a call from a first caller and handling said call using said plurality of script file elements;

storing in said memory a revised script file containing a second plurality of script file elements at least some of which are different from said plurality of script file elements;

receiving a call from a second caller and handling said second caller's call using said revised script file before the termination of handling said first caller's using said first plurality of script file elements.

10. Apparatus for obtaining, at a central location, job-application information from remotely located applicants for a particular job, comprising:

at least a first computer at said central location configured to receive both audio and keypress information over a telephone link, wherein said telephone link between at least a first of said applicants and said central location in response to said first applicant inputting a telephone number at a first telephone keypad;

means for receiving, at said central location, information identifying said first applicant;

an electronic memory storage device coupled to said first computer, for storing said information identifying said first applicant;

means for transmitting a first series of audio prompts from said central location over said telephone link to said first applicant under control of said first computer, wherein at least some of said audio prompts are specific to a first job and are different from at least some prompts in a second series of prompts which is specific to a second, different job, and wherein said second series of prompts are not transmitted to said first applicant where said first applicant is only applying for said first job;

means for transmitting, over said telephone line, directly to said central location, data indicative of audio and keypress responses input by said first applicant, in response to at least some of said prompts, said responses including at least some of said job-application information;

said electronic memory storage device, further storing said data indicative of said audio and keypress responses, in a mainer to permit said data indicative of said audio and keypress responses to be associated with said information identifying said first applicant; and means for outputting, from said central location, at least some of said job application information for at least said first and said associated information identifying said job applicant, said job application information being output in a format permitting human perception of said job application information without the need for reference to a response key.

11. Apparatus as claimed in claim 10, wherein said electronic memory storage device stores all said audio and keypress responses of said first job applicant.

12. Apparatus for obtaining job application information in an automated fashion over a telephone link comprising:

at least a first computer at a central location configured to receive both audio and keypress information relation to a job over said telephone link established by a job applicant placing a telephone call;

memory, coupled to said first computer which stores a plurality of script file elements each script file element being identified as one of a plurality of element types, at least one of said element types being a branch type for causing said script file elements to be processed out of order;

said computer being programmed with software to provide a script element processing procedure which includes performing a look-up to determine the type of action to be performed based on said element type and execution of a module corresponding to said element type configured to perform said action corresponding to said element type;

said computer further programmed to use said script element processing procedure to process elements of said script file, beginning with a first element in said script file and proceeding sequentially through said script file elements thereafter unless processing out of order is specified by a script file element of said branch type said processing of said script file elements providing a first series of prompts wherein said first series of prompts is specific to a first job and is different from at least some prompts in a second series of prompts which is specific to a second, different job;

wherein, an end user can provide modified call processing to alter the logic of how said telephone call is processed, the messages to be played to said job applicant, the number of questions asked and the number of DTMF characters captured by making modifications to said script file and without requiring recompilation of said software.

* * * * *